(12) United States Patent
Belair et al.

(10) Patent No.: US 7,478,137 B1
(45) Date of Patent: Jan. 13, 2009

(54) LIGHTWEIGHT MESSAGING WITH AND WITHOUT HARDWARE GUARANTEES

(75) Inventors: Stephen Belair, Santa Cruz, CA (US); Pradeep Kumar Kathail, Sunnyvale, CA (US); David Delano Ward, Somerset, WI (US); Michael B. Galles, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 708 days.

(21) Appl. No.: 10/325,812

(22) Filed: Dec. 19, 2002

(51) Int. Cl.
*G06F 15/167* (2006.01)

(52) U.S. Cl. .................. 709/212; 370/401; 370/352; 710/20; 710/21

(58) Field of Classification Search .............. 709/212; 370/401, 352; 710/20, 21
See application file for complete search history.

(56) References Cited

U.S. PATENT DOCUMENTS

| | | | |
|---|---|---|---|
| 6,055,619 A * | 4/2000 | North et al. ................... | 712/36 |
| 6,279,051 B1 * | 8/2001 | Gates et al. .................... | 710/20 |
| 6,778,548 B1 * | 8/2004 | Burton et al. ................ | 370/429 |
| 6,781,990 B1 * | 8/2004 | Puri et al. .................... | 370/392 |
| 6,842,454 B2 * | 1/2005 | Metcalf, III ................. | 370/392 |

* cited by examiner

*Primary Examiner*—Tonia L Dollinger
*Assistant Examiner*—Kyung H Shin
(74) *Attorney, Agent, or Firm*—Schwegman, Lundberg & Woessner, P.A.

(57) ABSTRACT

A lightweight messaging method and apparatus that includes creating a temporary receive data area, and if a receive operation is seen first, then creating an operational receive data area, and waiting for a corresponding send operation to fill the operational receive data area with sent data; and if the send operation is seen first, then filling the temporary receive data area with sent data, when the corresponding receive operation is seen, creating the operational receive data area, and moving the sent data from the temporary receive data area to the operational receive data area.

35 Claims, 3 Drawing Sheets

LIGHTWEIGHT MESSAGING WITH AND WITHOUT HARDWARE GUARANTEES

FIELD OF THE INVENTION

This invention relates to the field of networks and storage, and more specifically to a method and apparatus for sending messages over a network with little overhead.

BACKGROUND OF THE INVENTION

Interest in the use of network-based systems has increased considerably recently. Servers connected to a network provide a variety of commonly available functions that can be shared or allocated exclusively to each of a plurality of computers or other information-handling systems connected to a common network.

It is often desirable to have a single communications interface definition that is usable whether talking to a locally connected computer such as a tightly-coupled multiprocessor or talking to networked servers, or talking to remote devices. However, when a few well-defined server or other processors are connected locally, it can be desirable to have a thin or lightweight messaging scheme that uses minimal resources and that requires minimal handshaking between the sender and the receiver.

There is a need in the art for an improved apparatus and method for lightweight messaging over a network.

SUMMARY OF THE INVENTION

The present invention provides a lightweight messaging system that includes a first information-handling system, a second information-handling system, a network connection operatively connecting the first information-handling system to the second information-handling system. The system further includes a first process operating in the first information-handling system that issues a receive command, a second process operating in the second information-handling system that issues a send command to send data across the network connection to the first process. A send-receive handler operates in the first information-handling system that, if a receive command is seen first, creates an operational receive data area, and waits for a corresponding send operation to fill the operational receive data area with sent data, and that, if the send command is seen first, fills the temporary receive data area with sent data, when the corresponding receive operation is seen, creates the operational receive data area, and moves the sent data from the temporary receive data area to the operational receive data area.

Some embodiments further include a direct-memory-access (DMA) controller that interfaces with the send-receive handler to move sent data from the network connection to either the temporary receive data area or the operational receive data area based on whether the send command or the receive command is seen first. In some embodiments, the DMA controller includes a table that holds connection identifiers and corresponding memory addresses.

In some embodiments, the DMA controller checks each incoming send command connection identifier versus a receive connection identifier, if any, and if no match is found, defaults to a connection identifier and corresponding memory address of the temporary receive data area. In some such embodiments, the send-receive handler loads a receive connection identifier and corresponding operational receive data area address into the table upon execution of the receive command.

Another aspect of the present invention provides a lightweight messaging method that includes creating a temporary receive data area, and if a receive operation is seen first, then: creating 261 an operational receive data area, and waiting 262 for a corresponding send operation to fill 248 the operational receive data area with sent data; and if the send operation is seen first 242, then: filling 246 the temporary receive data area with sent data, when the corresponding receive operation is seen 263, creating 264 the operational receive data area, and moving 247 the sent data from the temporary receive data area to the operational receive data area.

Some embodiments of the method further include providing a direct-memory-access (DMA) function that controls the moving data from the network connection to either the temporary receive data area or the operational receive data area, based on whether the send command or the receive command is seen first.

In some embodiments, the DMA includes a table that holds connection identifiers and corresponding memory addresses specifying parameters for the moving.

Some embodiments further include checking each incoming send command connection identifier versus a receive connection identifier, if any, and if no match is found, defaulting to a connection identifier and corresponding memory address of the temporary receive data area.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
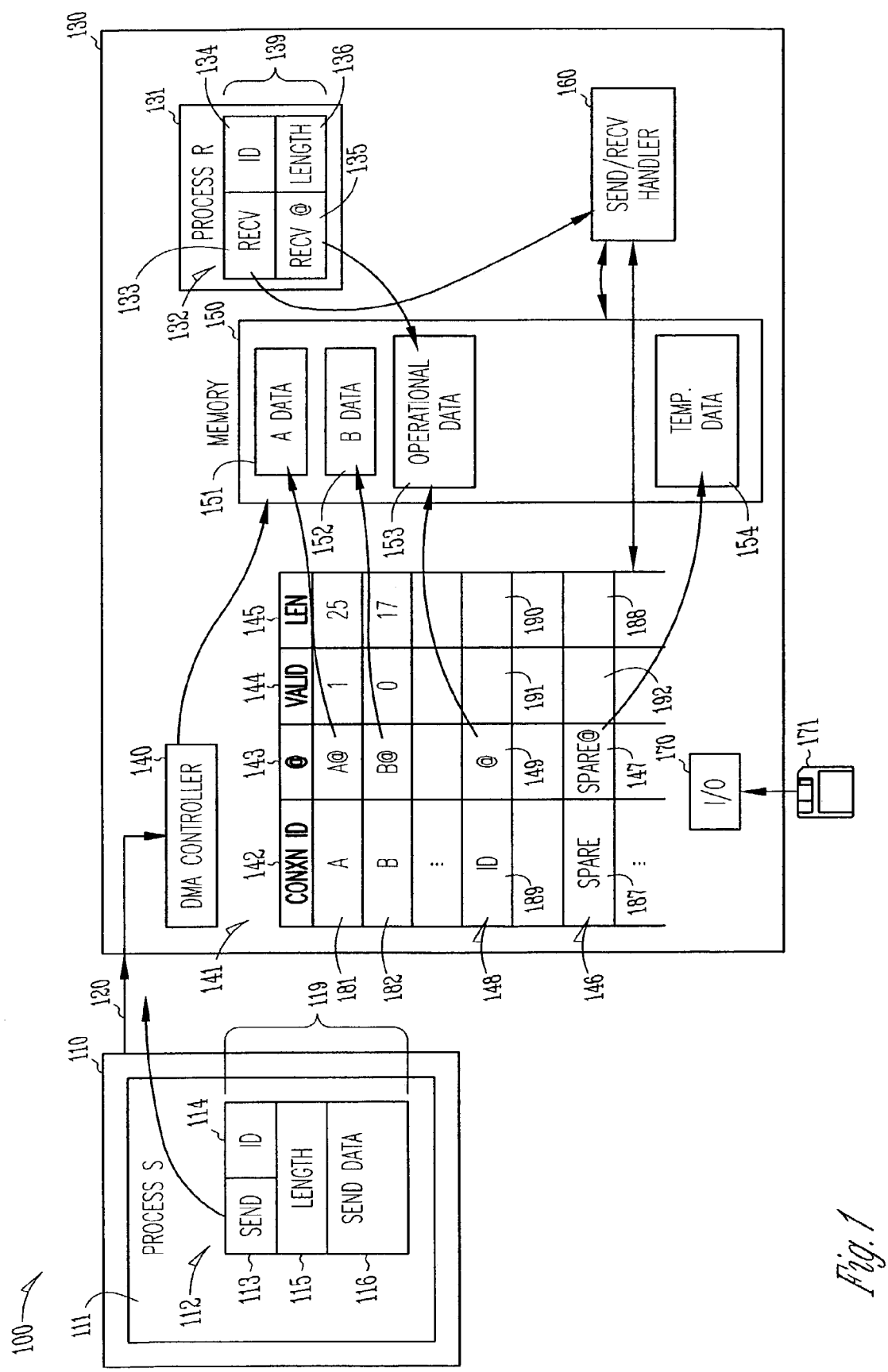
FIG. 1 is a function block diagram of an exemplary system 100 having lightweight messaging.

FIG. 1 is a block diagram of an exemplary system 100 using lightweight messaging. In some embodiments, system 100 includes a first processor 130 and a second processor 110 communicating to each other via network connection 120 (which is also called communications line 120). Each processor has a plurality of processes running, for example in a time-multiplexed manner. For simplicity of explanation, only one process is shown in each processor. A first process R 131 is running in processor 130, and for this example, is about to perform a receive operation to receive data that it expects to be sent to it from the second process S 111. Process S 111 is running in processor 110, and for this example, is about to perform a send operation to send data 116 to the first process R 131. Previously, process 111 and process 131 established communications by opening a "connection" and each was given the same connection identifier (also called conxnID or connection ID) to be used when communicating (sending or receiving) on this connection.

In some embodiments, the send operation involves process 111 performing a send operation that transmits send data structure 112 across network connection 120. In some embodiments, send data structure 112 includes a send op code 113, a connection ID 114, a length indication 115, and a block of send data 116. In some embodiments, a start code and an end code are also sent.

In some embodiments, the receive operation involves process 131 performing a receive operation defined by receive data structure 132. In some embodiments, receive data structure 132 includes a receive op code 133, a connection ID 134, a length indication 136, and an address 135 of where to put the sent data. In some embodiments, a send/receive handler program 160 helps maintain a table 141 that is used to define blocks (151, 152, 153, 154, etc.) in memory 150. In some embodiments, table 141 includes the following fields: connection ID 142, block address 143, validity indication 144 and length indication 145. Other embodiments use fewer or more fields in table 141. As an example, entry 181 includes an connection ID 142 of "A" and a block address 143 of A@ (i.e., the address of A) that points to the block 151 of A data. The validity indication 144 of "1" shows that A data 151 is valid, and the length indication 145 of "25" indicates the length of the block in some predetermined units. This would be an entry where the data has been received. Similarly, entry 182 includes an connection ID 142 of "B" and a block address 143 of B@ that points to the block 152 of B data. The validity indication 144 of "0" shows that B data 152 is not valid, and the length indication 145 of "17" indicates the reserved length of the block in some predetermined units. This would be the format of an entry that had been set up by the send/receive handler 160 upon execution of a receive operation before any data had been received.

In some embodiments, a hardware DMA handler 140 is provided to move incoming sent data directly from network connection 120 into memory 150 without processor intervention. DMA controller 140 uses table 141 to obtain addresses and a length parameter for routing the incoming data and for checking it. For example, if incoming data had a connection ID of "B," the DMA controller 140 would check each of the connection IDs 142 until it found the "B" in table entry 182, it would use the B@ as a pointer to B data area or block 152, and would automatically move the incoming data to block 152. When the data transfer is complete, the validity indication 144 of entry 182 is marked "valid." In some embodiments, the length of the incoming data is checked using parameter 145 from table entry 182, and if this parameter does not correspond to the length of the incoming data, the validity is marked "invalid."

In some embodiments, the DMA controller 140 may not find the connection ID of the incoming data in table 141 (for example, if no receive operation for that connection ID has yet been executed). For such a case, one or more "spare" table entries 146 are provided. Each spare entry 146 points (using address 147) to a corresponding temporary data block 154 having a length large enough to handle the largest expected incoming data length. Thus, even though no receive operation has yet been executed to define a space for the incoming data on a particular connection ID, the incoming data is not rejected, but it is placed into block 154. In some embodiments, the appropriate fields 187, 188, and 192 of table entry 146 are filled in by DMA controller 140 with the connection ID, the length indication, and the validity indication, respectively, of the incoming data. Later, when the corresponding receive operation is performed, send/receive handler (SRH) 160 will reserve the operational receive data area 153 by filling in the connection ID 189 and the block address 149 into table entry 148. It then checks entry 146 to see if the data has already been sent and stored, and SRH 160 will move the sent data from block 154 to block 153, will check the sent length 188 against the expected length 190, and will mark the validity indication 191 as appropriate.

Since process 111 and process 131 are running substantially asynchronously to one another, the time sequence order of the send operation and the receive operation is not known beforehand. In processor 130, ideally, the receive operation is seen first, in order to reserve the operational receive data area 153 and set up table entry 148.

In conventional systems, the send process 111 might need to send a tentative signal with a connection ID across network connection 120, and a handshake signal would be returned (by, say, DMA controller 140) indicating whether an entry 148 matching that connection ID was set up, and if not, the send operation would be held off. Repeated polling might be needed until the receive operation had set up entry 148 with the matching connection ID. This is slow and inefficient.

In the present invention, no such handshaking operations are needed. The send operation can be executed immediately, and the sent data will be placed into temporary data area 154 if the receive operation has not been executed (i.e., no matching connection ID is found in table 141, so the spare entry 146 is used), or the sent data will be placed into operational data area 153 if the receive operation has been executed (i.e., the matching connection ID is found at entry 148 in table 141, so entry 148 is used).

In some embodiments, table 141 is provided with a large number of spare entries 146 each having a corresponding temporary receive data block 154. The hardware DMA controller 140 thus guarantees that nearly any incoming data block will have a temporary receive data block 154. Further, if all the spare entries have been used (a rare instance), the DMA controller 140 will return an error code across network connection 120 to process 111 informing it that no space was available (an overflow condition). Thus some send operations will have their respective operational receive data area 153 ready and waiting when they arrive, and they are moved directly to where they will be used; most other send operations will have their respective temporary receive data area 154 ready and waiting when they arrive, and they are moved first to that temporary receive data area 154, and are later moved to their respective operational receive data area 153 where they will be used. Only in rare instances will an error code have to be returned to the sending process 11.

In other embodiments, a software function is provided that is equivalent to the hardware DMA controller 140 described above. In still other embodiments, a combination of hardware and software is provided.

Figure 2:
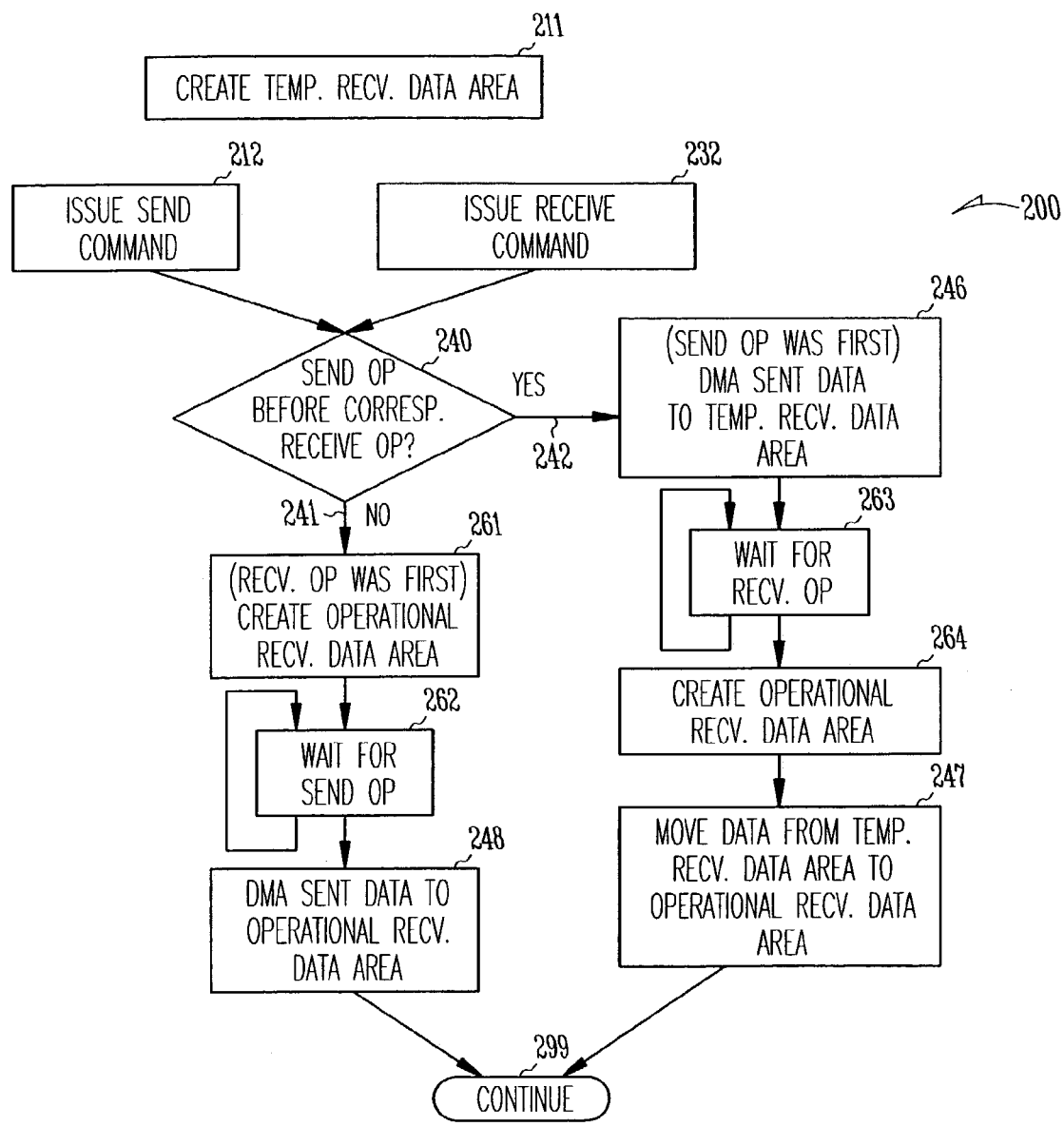
FIG. 2 shows a flowchart 200 of one embodiment of lightweight messaging.

FIG. 2 shows a flowchart 200 of one embodiment of lightweight messaging. At some initial time, block 211 creates one or more temporary receive data areas 154. In some embodiments, a table 141 is provided, and a spare table entry 146 is used to point to each respective temporary receive data areas 154. At some point in time, a send command is issued (block 212) and at some other point in time (before, during, or after the send command), a receive command is issued (block 232). At block 240, it is determined whether the send operation occurred before the corresponding receive operation.

If the send operation occurred first, block 246 is executed, wherein a DMA operation is performed to move the sent data to the temporary receive data area 154. Block 263 represents waiting for the corresponding receive operation to occur, and when it does, block 264 represents creating the operational receive data area 153. Block 247 then represents moving the data from the temporary receive data area 154 to the operational receive data area 153. The operation of the processes then continues at block 299.

If the receive operation occurred first, block 261 is executed, representing creating the operational receive data area. Block 262 represents waiting for the corresponding send operation to occur, and when it does, block 248 represents a DMA operation being performed to move the sent data to the operational receive data area. The operation of the processes then continues at block 299.

Figure 3:
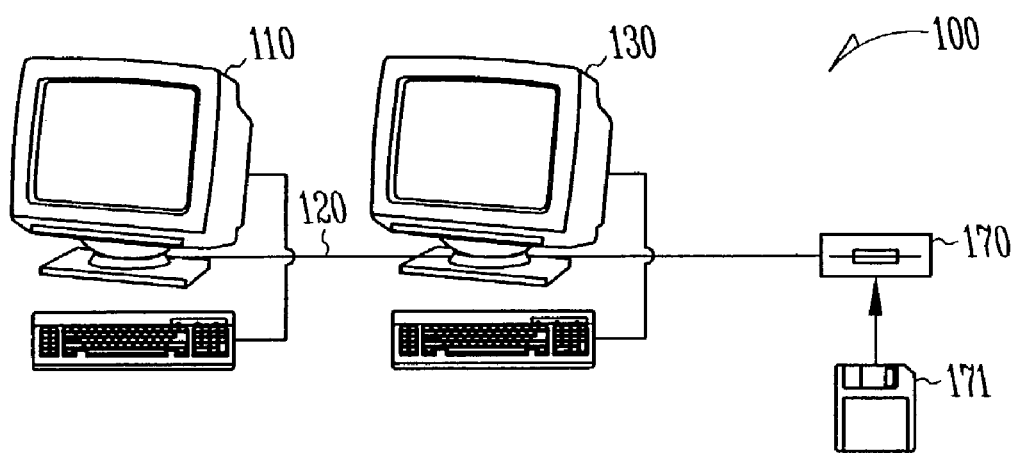
FIG. 3 is a block diagram of an exemplary system 100 having lightweight messaging.

FIG. 3 is a block diagram of an exemplary system 100 having lightweight messaging. Processor 110 is connected to processor 130 via network connection 120. In some embodiments, processor 130 includes an input-output device 170 such as a diskette drive or a CDROM drive. Computer readable media 171, such as a diskette or a CDROM contains instructions coded thereon for causing a suitably programmed system to execute a method of the present invention, such as that of FIG. 2. In other embodiments, other suitable media 171, such as data stored in a server or on the internet is used to provide such instructions.

CONCLUSION

The present invention provides a lightweight messaging system 100 that includes a first information-handling system 130, a second information-handling system 110, a network connection 120 operatively connecting the first information-handling system 130 to the second information-handling system 110. The system further includes a first process 131 operating in the first information-handling system 130 that issues a receive command 133, a second process 111 operating in the second information-handling system 110 that issues a send command 113 to send data across the network connection 120 to the first process 130. A send-receive handler 160 operates in the first information-handling system 130 that, if a receive command 133 is seen first, creates an operational receive data area 153, and waits for a corresponding send operation 113 to fill the operational receive data area 153 with sent data; and that, if the send command 113 is seen first, fills the temporary receive data area 154 with sent data, when the corresponding receive operation 133 is seen, creates the operational receive data area 153, and moves the sent data from the temporary receive data area 154 to the operational receive data area 153.

Some embodiments further include a direct-memory-access (DMA) controller 140 that interfaces with the send-receive handler 160 to move sent data 116 from the network connection 120 to either the temporary receive data area 154 or the operational receive data area 153, based on whether the send command 111 or the receive command 131 is seen first.

In some embodiments, the DMA controller includes a table 141 that holds connection identifiers 142 and corresponding memory addresses 143.

In some embodiments, the DMA controller 140 checks each incoming send command connection identifier 114 versus a receive connection identifier 142, if any, and if no match is found, defaults to a connection identifier 146 and corresponding memory address of the temporary receive data area 154. In some such embodiments, the send-receive handler 160 loads a receive connection identifier 148 and corresponding operational receive data area address 149 into the table 141 upon execution of the receive command 131.

In some embodiments, the table 141 further holds corresponding memory space lengths 145 and/or validity indications 144.

Some embodiments have an architecture that includes a send command definition 119 including a send op-code 113, a send connection ID 114, a send length 115, and send data 116, and a receive command definition 139 including a receive op-code 133, a receive connection ID 134, a receive length 136, and an operational receive data area address 135.

Another aspect of the present invention provides a lightweight messaging method 200 that includes creating 211 a temporary receive data area, and if a receive operation is seen first 241, then:
creating 261 an operational receive data area, and waiting 262 for a corresponding send operation to fill 248 the operational receive data area with sent data; and if the send operation is seen first 242, then:
filling 246 the temporary receive data area with sent data, when the corresponding receive operation is seen 263, creating 264 the operational receive data area, and moving 247 the sent data from the temporary receive data area to the operational receive data area.

Some embodiments of the method further include providing a direct-memory-access (DMA) function that controls the moving data from the network connection to either the temporary receive data area or the operational receive data area, based on whether the send command or the receive command is seen first.

In some embodiments of the method, the DMA includes a table that holds connection identifiers and corresponding memory addresses specifying parameters for the moving.

Some embodiments of the method further include checking each incoming send command connection identifier versus a receive connection identifier, if any, and if no match is found, defaulting to a connection identifier and corresponding memory address of the temporary receive data area.

Some embodiments of the method further include loading a receive connection identifier and corresponding operational receive data area address into the table upon execution of the receive command.

In some embodiments of the method, the table further holds corresponding memory space lengths and validity indications for checking and validating the data.

Some embodiments of the method further include defining an architecture that includes: a send command definition including a send op-code, a send connection ID, a send length, and send data, and a receive command definition including a receive op-code, a receive connection ID, a receive length, and an operational receive data area address.

Other embodiments of the invention provide computer-usable information medium having a program of control information thereon for causing a suitably programmed system to perform one or more embodiments of the above methods, when such program is executed on the system.

Another aspect of the invention provides a messaging system that includes a first information-handling system. This first system includes a network connection, a first process operating in the first information-handling system that issues a receive command, a DMA controller in the first information-handling system that receives a send command and its associated send data across the network connection, a send-receive handler that operates in the first information-handling system and creates a temporary receive data area; and that, if a receive command is seen first, creates an operational receive data area, and waits for the corresponding send operation to fill the operational receive data area with sent data; and that, if the send command is seen first, fills the temporary receive data area with sent data, when the corresponding receive operation is seen, creates the operational receive data area, and moves the sent data from the temporary receive data area to the operational receive data area.

Some embodiments of this first information-handling system further include a direct-memory-access (DMA) controller that interfaces with the send-receive handler to move data from the network connection to either the temporary receive data area or the operational receive data area, based on whether the send command or the receive command is seen first.

In some embodiments of this first information-handling system, the DMA controller includes a table that holds a plurality of connection identifiers and a plurality of corresponding memory addresses.

In some embodiments of this first information-handling system, the DMA controller checks each incoming send command connection identifier versus a receive connection identifier, if any, and if no match is found, defaults to a connection identifier and corresponding memory address of the temporary receive data area.

In some embodiments of this first information-handling system, the send-receive handler loads a receive connection identifier and corresponding operational receive data area address into the table upon execution of the receive command.

In some embodiments of this first information-handling system, the send-receive handler loads a receive connection identifier and corresponding operational receive data area address into the table upon execution of the receive command.

In some embodiments of this first information-handling system, the table further holds corresponding memory space lengths and validity indications.

Some embodiments of this first information-handling system further include an architecture that includes a send command definition including a send op-code, a send connection ID, a send length, and send data; and a receive command definition including a receive op-code, a receive connection ID, a receive length, and an operational receive data area address.

The present invention also provides combinations of any two or more of the above features.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A messaging system comprising:
a first information-handling system;
a second information-handling system;
a network connection operatively connecting the first information-handling system to the second information-handling system;
a first process operating in the first information-handling system that issues a receive command, the receive command resulting in a receive operation;
a second process operating in the second information-handling system that issues a send command to send data across the network connection to the first process, the send command resulting in a send operation that corresponds with the receive operation;
a send-receive handler that operates in the first information-handling system and creates a temporary receive data area and that, if the receive operation occurs before the corresponding send operation, creates an operational receive data area, and waits for the corresponding send operation to fill the operational receive data area with sent data; otherwise, if the send operation occurs before the corresponding receive operation, the send-receive handler fills the temporary receive data area with sent data, when the corresponding receive operation occurs, creates the operational receive data area, and moves the sent data from the temporary receive data area to the operational receive data area.

2. The system of claim 1, further comprising
a direct-memory-access (DMA) controller that interfaces with the send-receive handler to move data from the network connection to either the temporary receive data area or the operational receive data area, based on whether the send command or the receive command occurs first.

3. The system of claim 2, wherein the DMA controller includes a table that holds a plurality of connection identifiers and a plurality of corresponding memory addresses.

4. The system of claim 3, wherein the DMA controller checks each incoming send command connection identifier versus a receive connection identifier, if any, and if no match is found, defaults to a connection identifier and corresponding memory address of the temporary receive data area.

5. The system of claim 4, wherein the send-receive handler loads a receive connection identifier and corresponding operational receive data area address into the table upon execution of the receive command.

6. The system of claim 3, wherein the send-receive handler loads a receive connection identifier and corresponding operational receive data area address into the table upon execution of the receive command.

7. The system of claim 3, wherein the table further holds corresponding memory space lengths and validity indications.

8. The system of claim 1, further comprising an architecture that includes
a send command definition including a send op-code, a send connection ID, a send length, and send data; and
a receive command definition including a receive op-code, a receive connection ID, a receive length, and an operational receive data area address.

9. A messaging method comprising:
creating a temporary receive data area;
waiting for a receive operation and a corresponding send operation; and
if the receive operation occurs before the corresponding send operation, then:
creating an operational receive data area, and
waiting for the corresponding send operation to fill the operational receive data area with sent data; otherwise
if the send operation occurs before the corresponding receive operation, then:
filling the temporary receive data area with sent data,
when the corresponding receive operation occurs, creating the operational receive data area, and
moving the sent data from the temporary receive data area to the operational receive data area.

10. The method of claim 9, further comprising providing direct-memory-access (DMA) that controls the moving data from the network connection to either the temporary receive data area or the operational receive data area, based on whether the send command or the receive command occurs first.

11. The method of claim 10, wherein providing the DMA includes providing a table that holds connection identifiers and corresponding memory addresses specifying parameters for the moving.

12. The method of claim 11, further comprising checking each incoming send command connection identifier versus a receive connection identifier, if any, and if no match is found, defaulting to a connection identifier and corresponding memory address of the temporary receive data area.

13. The method of claim 12, further comprising loading a receive connection identifier and corresponding operational receive data area address into the table upon execution of the receive command.

14. The method of claim 11, further comprising loading a receive connection identifier and corresponding operational receive data area address into the table upon execution of the receive command.

15. The method of claim 11, wherein the table further holds corresponding memory space lengths and validity indications for checking and validating the data.

16. The method of claim 9, further comprising defining an architecture that includes
   a send command definition including a send op-code, a send connection ID, a send length, and send data, and
   a receive command definition including a receive op-code, a receive connection ID, a receive length, and an operational receive data area address.

17. The method of claim 9, further comprising checking each incoming send command connection identifier versus a receive connection identifier, if any, and if no match is found, defaulting to a connection identifier and corresponding memory address of the temporary receive data area.

18. The method of claim 9, further comprising:
   providing a table that holds connection identifiers and corresponding memory addresses specifying parameters for the moving;
   checking each incoming send command connection identifier versus a receive connection identifier, if any, and if no match is found, defaulting to a connection identifier and corresponding memory address of the temporary receive data area; and
   loading a receive connection identifier and corresponding operational receive data area address into the table upon execution of the receive command.

19. The method of claim 18, wherein the table further holds corresponding memory space lengths and validity indications for checking and validating the data.

20. A computer-usable information medium having a program of control information thereon for causing a suitably programmed system to perform the method of claim 9 when such program is executed on the system.

21. A messaging apparatus comprising:
   a network connection;
   a first process operating in the messaging apparatus that issues a receive command, the receive command resulting in a receive operation;
   a DMA controller in the messaging apparatus that receives a send command and its associated send data across the network connection, the send command resulting in a send operation that corresponds with the receive operation;
   a send-receive handler that operates in the messaging apparatus and creates a temporary receive data area; and that, if the receive operation occurs before the corresponding send operation, creates an operational receive data area, and waits for the corresponding send operation to fill the operational receive data area with sent data; otherwise, if the send operation occurs before the corresponding receive operation, fills the temporary receive data area with sent data, when the corresponding receive operation occurs, creates the operational receive data area, and moves the sent data from the temporary receive data area to the operational receive data area.

22. The apparatus of claim 21, further comprising a direct-memory-access (DMA) controller that interfaces with the send-receive handler to move data from the network connection to either the temporary receive data area or the operational receive data area, based on whether the send command or the receive command occurs first.

23. The apparatus of claim 22, wherein the DMA controller includes a table that holds a plurality of connection identifiers and a plurality of corresponding memory addresses.

24. The apparatus of claim 23, wherein the DMA controller checks each incoming send command connection identifier versus a receive connection identifier, if any, and if no match is found, defaults to a connection identifier and corresponding memory address of the temporary receive data area.

25. The apparatus of claim 24, wherein the send-receive handler loads a receive connection identifier and corresponding operational receive data area address into the table upon execution of the receive command.

26. The apparatus of claim 23, wherein the send-receive handler loads a receive connection identifier and corresponding operational receive data area address into the table upon execution of the receive command.

27. The apparatus of claim 23, wherein the table further holds corresponding memory space lengths and validity indications.

28. The apparatus of claim 21, further comprising an architecture that includes
   a send command definition including a send op-code, a send connection ID, a send length, and send data; and
   a receive command definition including a receive op-code, a receive connection ID, a receive length, and an operational receive data area address.

29. A messaging system comprising:
   a first information-handling system;
   a second information-handling system;
   a network connection operatively connecting the first information-handling system to the second information-handling system; and
   means for lightweight messaging between the first information-handling system and the second information-handling system, including send-receive handling means for,
   if a receive operation occurs before a corresponding send operation, creating an operational receive data area and waiting for the corresponding send operation to fill the operational receive data area with sent data, otherwise, if the send operation occurs before the corresponding receive operation, creating a temporary receive data area and filling the temporary receive data area with sent data, and when the corresponding receive operation occurs, creating the operational receive data area and moving the sent data from the temporary receive data area to the operational receive data area.

30. The system of claim 29, further comprising a table that holds connection identifiers and corresponding memory addresses specifying parameters for data moving.

31. The system of claim 30, further comprising
   means for checking each incoming send command connection identifier versus a receive connection identifier, if any, and if no match is found, for defaulting to a connection identifier and corresponding memory address of the temporary receive data area.

32. A messaging system comprising:
   a first information-handling system;

a network connection operatively connecting the first information-handling system to a second information-handling system; and means for messaging between the first information-handling system and the second information-handling system, including send-receive handling means for, if a receive operation occurs before a corresponding send operation, creating an operational receive data area and waiting for the corresponding send operation to fill the operational receive data area with sent data, otherwise, if the send operation occurs before the corresponding receive operation, creating a temporary receive data area and filling the temporary receive data area with sent data, and when the corresponding receive operation is seen occurs, creating the operational receive data area and moving the sent data from the temporary receive data area to the operational receive data area.

33. The system of claim 32, further comprising a table that holds connection identifiers and corresponding memory addresses specifying parameters for data moving.

34. The system of claim 33, further comprising means for checking each incoming send command connection identifier versus a receive connection identifier, if any, and if no match is found, defaulting to a connection identifier and corresponding memory address of the temporary receive data area.

35. The system of claim 34, further comprising means for loading a receive connection identifier and corresponding operational receive data area address into the table upon execution of the receive command.

* * * * *

UNITED STATES PATENT AND TRADEMARK OFFICE
CERTIFICATE OF CORRECTION

| | |
|---|---|
| PATENT NO. | : 7,478,137 B1 |
| APPLICATION NO. | : 10/325812 |
| DATED | : January 13, 2009 |
| INVENTOR(S) | : Belair et al. |

It is certified that error appears in the above-identified patent and that said Letters Patent is hereby corrected as shown below:

In column 4, line 44, delete "process 11." and insert -- process 111. --, therefor.

In column 11, line 14, in Claim 32, after "operation" delete "is seen".

Signed and Sealed this

Nineteenth Day of May, 2009

JOHN DOLL
*Acting Director of the United States Patent and Trademark Office*